United States Patent [19]
Smith et al.

[11] Patent Number: 5,145,695
[45] Date of Patent: Sep. 8, 1992

[54] COMPOSITION AND METHOD THEREOF FOR INCREASING MILK PRODUCTION IN DAIRY CATTLE

[75] Inventors: Steven I. Smith, Zimmerman; John A. Foley, Jr., Minneapolis, both of Minn.

[73] Assignee: Cargill, Incorporated, Minneapolis, Minn.

[21] Appl. No.: 572,755

[22] Filed: Aug. 24, 1990

[51] Int. Cl.$^5$ .......................... A23K 1/04; A23K 1/06; A23K 1/00

[52] U.S. Cl. .......................................... 426/2; 426/74; 426/623; 426/630; 426/636; 426/646; 426/647; 426/656; 426/657; 426/807

[58] Field of Search ...................... 426/647, 2, 72, 74, 426/623, 630, 656, 807, 636, 646, 657

[56] References Cited

U.S. PATENT DOCUMENTS

| | | | |
|---|---|---|---|
| 3,168,888 | 2/1965 | Brodrick | 426/2 |
| 3,263,651 | 8/1966 | Anderson | 426/2 |
| 3,925,560 | 12/1975 | Scott et al. | 426/2 |
| 4,118,513 | 10/1978 | Braund et al. | 426/2 |
| 4,175,121 | 11/1979 | Mantha | 426/2 |
| 4,181,708 | 1/1980 | Dannelly | 424/19 |
| 4,186,213 | 1/1980 | Burroughs et al. | 426/2 |
| 4,248,899 | 2/1981 | Lyon et al. | 426/93 |
| 4,642,317 | 2/1987 | Palmquist et al. | 514/588 |
| 4,824,679 | 4/1989 | Freeman | 426/2 |

OTHER PUBLICATIONS

Morrison "Feeds and Feeding" Morrison Publishing Co., Ithaca New York 1957 pp. 627–635, 1096–1103, 1115–1119 & 1033–1145.

T. S. Neudoerffer, D. B. Duncan and F. D. Horney, "The Extent of Release of Encapsulated Methionine in the Intestine of Cattle", 25 *Br. J. Nutr.*, pp. 333–341 (1971).

T. C. Jenkins and D. L. Palmquist, "Effect of Added Fat and Calcium on In Vitro Formation of Insoluble Fatty Acid Soaps and Cell Wall Digestibility", 55 *Journal of Animal Science*, pp. 957–963 (1982).

T. C. Jenkins and D. L. Palmquist, "Effect of Faty Acids or Calcium Soaps on Rumen and Total Nutrient Digestibility of Dairy Rations", 67 *J. Dairy Sci.*, pp. 978–986 (1984).

M. S. Aseltine, "Bypass Protein Requirements of Dairy Cows Reviewed", 17 *Feedstuffs*, pp. 16–30 (1989).

"Bypass Protein in Dairy Rations", Proceedings of Dairy Research Conference, Jan. 26, 1990, University of Minnesota.

*Primary Examiner*—R. B. Penland
*Attorney, Agent, or Firm*—Fitch, Even, Tabin & Flannery

[57] ABSTRACT

A composition and method thereof for increasing milk production in diary cattle by balancing the essential amino acids via a particular complete feed, concentrate, or blender or base mix form of the composition which delivers essential amino acids post-ruminally wherein the composition generally comprises wheat middlings; corn; soybean meal; corn gluten meal; distillers grains or distillers grains with solubles; blood meal; fat; macro-minerals, which include calcium, phosphorous, magnesium, potassium, sodium, chlorine and sulfur; trace minerals, which include cobalt, copper, iodine; iron, manganese, selenium and zinc; and vitamins, which include vitamin A, vitamin D and vitamin E.

39 Claims, No Drawings

COMPOSITION AND METHOD THEREOF FOR INCREASING MILK PRODUCTION IN DAIRY CATTLE

BACKGROUND OF THE INVENTION

1. Field of the Invention

This invention relates generally to a method and composition thereof for increasing the milk production in dairy cattle.

Increasing the milk production of lactating dairy cattle is an ongoing challenge facing the dairy industry. The challenge is complicated by the fact that, even though a dairy cow's diet can meet her requirement for crude protein, she may still lack some essential amino acids at the levels required for high milk production. One cause of this dilemma is the digestive system of the dairy cow herself.

Ingested feed first passes into the reticulorumen, where it is subject to anaerobic microbial fermentation. This microbial fermentation begins the digestive process and gives the ruminant the ability to utilize fibrous feeds that the mammalian system alone cannot break down due to the lack of necessary enzyme systems. The host animal subsequently meets her own nutrient needs by utilizing the by-products of this extensive fermentation, along with any undigested feed residues and the resultant microbial mass that passes from the rumen.

This microbial activity is certainly an advantage to the ruminant, because it allows them to benefit from feeds for which there is little competition from non-ruminants. However, the microbial intervention limits our ability to provide supplemental nutrients to the ruminant, because many desirable nutrients, such as proteins and amino acids, will be metabolized before they reach a site where they can be absorbed and utilized by the host animal.

A large portion of dietary protein is broken down in the rumen to soluble peptides and amino acids. Some of these peptides and amino acids are utilized by the microbial population directly, but most are further degraded to form ammonia. This ammonia is then used by the microbial population for de novo synthesis of amino acids to meet their own needs. In many cases, this microbial intervention results in the improvement of the amino acid profile being offered to the host.

Many techniques, formulations and the like have been tried in the past to protect the useful products from further degradation in the rumen. Encapsulation of methionine is discussed in Neudoerffer, Duncan and Horney, "The Extent of Release of Encapsulated Methionine in the Intestine of Cattle," 25 *British Journal of Nutrition*, p.333-341 (1971). Another method that has been tried is to supplement the feed with fatty acids in the form of calcium salts without reducing fiber digestibility, which is disclosed in U.S. Pat. No. 4,642,317 to Palmquist et al. In U.S. Pat. No. 4,248,899 to Lyon et al., a feed supplement is prepared from protein extracted from a leafy green source. The protein is then combined with a triglyceride lipid material.

These methods involve extensive processing. It is highly desirable to have a more simple, economical and productive method for supplying sufficient quantities of essential amino acids in the proper balance to the small intestines where absorption takes place.

SUMMARY OF THE INVENTION

This invention relates generally to a method and composition thereof for increasing the milk production in dairy cattle. By feeding the cattle a particular feed composition which delivers an improved balance of essential amino acids post-ruminally, the cow's milk production is increased. This invention provides a unique approach to feed formulation. The invention is a formulation of dairy feedstuffs, balanced to deliver necessary amino acid requirements at a particular point in the cow's digestive system, rather than, as in the past, just attempting to meet crude protein requirements of the animal. By properly adjusting a particular feed composition to deliver essential amino acids in balance post-ruminally, overall production is enhanced and deficiencies and excesses are minimized.

The composition can be used in several forms: complete feed form, concentrate form, blender form and base mix form. If the composition is in the form of a complete feed, the percent protein level is about 14 to about 24 percent; whereas, if the composition is in the form of a concentrate, the protein level is about 32 to about 48, percent, if the composition is in the form of a blender, the protein level in the composition is about 24 to about 26 percent; and if the composition is in the form of a base mix, the protein level in the composition is about 55 to about 65 percent.

The complete feed form composition generally contains wheat middlings, corn, soybean meal, corn gluten meal, distillers grains or distillers grains with solubles, blood meal, salt, macro-minerals, trace minerals and vitamins. Alternative ingredients would commonly include, but not be restricted to, meat and bone meal, fat, sunflower meal, malt sprouts and soybean hulls.

The concentrate form composition generally contains wheat middlings, corn, soybean meal, corn gluten meal, distillers grains or distillers grains with solubles, blood meal, salt, macro-minerals, trace minerals and vitamins. Alternative ingredients would commonly include, but not be restricted to, meat and bone meal, fat, sunflower meal and malt sprouts.

The blender form composition generally contains wheat middlings, corn gluten meal, distillers grains or distillers grains with solubles, blood meal, salt, macro-minerals, trace minerals and vitamins. Alternative ingredients would commonly include, but not be restricted to, meat and bone meal, corn, soybean meal, fat, sunflower meal, malt sprouts and soybean hulls.

The base form composition generally contains wheat middlings, corn gluten meal, distillers grains or distillers grain with solubles and blood meal. Alternative ingredients would commonly include, but are not restricted to, soybean meal, meat and bone meal, sunflower meal, malt sprouts, fat, macro-minerals, trace-minerals and vitamins.

DETAILED DESCRIPTION OF THE PREFERRED EMBODIMENTS

The invention herein is a method and composition therefore for increasing milk production in dairy cattle.

By feeding this particular composition to ruminants, essential amino acids are delivered post-ruminally in a particular balance. The key amino acids are lysine, methionine, histidine and phenylalanine. These amino acids are delivered post-ruminally to the abomasum, at which point they are subjected to mammalian digestion that would result in their being absorbed and made available to the mammary gland in proper quantities and proportions to support enhanced milk production.

The composition can be used in several forms: complete feed form, concentrate form, blender form and base mix form. By complete feed form it is meant that the feed represents the cow's entire grain ration. By concentrate form it is meant that the feed will be used as the primary supplemental protein source and would normally be fed with grain to meet the cow's protein needs. By blender form it is meant that the feed will be mixed in approximately a 50:50 ratio with grain to form the complete grain ration. The base mix form is similar to the concentrate form, but is typically higher in protein content and is used at lower inclusion rates. The base mix form will be a primary, but often not the sole source of supplemental protein.

The grains fed with the blender, concentrate and base mix forms of the composition include, but are not limited to, corn, barley, oats, millet, rice, sorghum and wheat, and intakes of the total grain ration will typically range from 6 to about 37 lbs./day.

If the composition is in the complete feed form, the percent protein level is about 14 to about 24 percent; whereas, if the composition is in the form of a concentrate, the protein level is about 32 to about 48 percent; if the composition is in the form of a blender, the protein level in the composition is about 24 to about 26 percent; and if the composition is in the form of a base mix, the protein level in the composition is about 55 to about 65 percent.

Total supply of the key essential amino acids post-ruminally, whether the ration is based upon the complete feed form, the concentrate form, the blender form or base form of the invention, should be in the amount of about 69 to about 332 grams/day lysine, about 20 to 105 grams/day methionine, about 22 to 113 grams/day histidine, and about 44 to 225 grams/day phenylalanine. These requirements will depend upon body weight and level of production as shown in Table 1 and the following equations:

Lysine requirement (g) = 8.23 + (147.13 × MP) + (0.02458 × BW);

Methionine requirement (g) = 1.8017 + (47.244 × MP) + (0.00558 × BW);

Histidine requirement (g) = 2.348 + (50.514 × MP) + (0.007166 × BW); and

Phenylalanine require (g) = 3.883 + (101.62 × MP) + (0.01216 × BW);

Where: MP = Kg. milk protein
BW = Kg. body weight.

TABLE 1

Post-rumenal Amino Acid Requirements

Body weight: 600 Kg.
Milk protein: 3.5%

| 4% FCM* (Kg.) | Milk protein (Kg.) | Post-rumenal amino acid requirement (g/day) | | | |
|---|---|---|---|---|---|
| | | Lys | Met | His | Phe |
| 20 | 0.7 | 125.9 | 38.2 | 42.0 | 82.3 |
| 30 | 1.05 | 177.4 | 54.7 | 59.7 | 117.9 |
| 40 | 1.4 | 228.9 | 71.3 | 77.4 | 153.4 |
| 50 | 1.75 | 280.4 | 87.8 | 95.0 | 189.9 |
| 60 | 2.1 | 331.9 | 104.4 | 112.7 | 224.6 |

Body Weight: 400 (Kg.)
Milk protein: 3.5%

TABLE 1-continued

Post-rumenal Amino Acid Requirements

| 4% FCM (Kg.) | Milk protein (Kg.) | Post-rumenal amino acid requirement (g/day) | | | |
|---|---|---|---|---|---|
| | | Lys | Met | His | Phe |
| 10 | 0.35 | 69.5 | 20.6 | 22.9 | 44.3 |
| 20 | 0.7 | 121.0 | 37.1 | 40.6 | 79.9 |
| 30 | 1.05 | 172.5 | 53.6 | 58.2 | 115.4 |
| 40 | 1.4 | 224.0 | 70.2 | 75.9 | 151.0 |
| 50 | 1.75 | 275.5 | 86.7 | 93.6 | 186.6 |

*4% fat corrected milk —(0.4) (kg milk) + (15) (kg of milk fat)

This requirement can be met by essential amino acids from two sources, protein of microbial origin, which was synthesized in the rumen, and from undegraded intake protein. Microbial crude protein (MCP) synthesis is primarily a function of microbial growth, which in turn is dependent upon the amount of fermentable energy in the diet. The level of fermentable energy can be estimated using the method of Tilley and Terry, "A Two Stage Technique for the *In Vitro* Digestion of Forage Crope," *J. of the British Grassland Society*. 18:104–111 (1963). This fermentable energy can be expressed as non-fat net energy of lactation (NFNE$_1$). The technique referenced above can be applied to determine the amount of net energy of lactation (NE$_1$) that the total daily ration provides from components other than fat, that is, non-fat net energy of lactation. It is important to exclude fat, since the rumen microbial population can derive little energy from fat to support their growth. This value for NFNE$_1$ (Mcal/kg) can then be applied to estimate microbial amino acid flow as follows:

$$MCP\ (g) = 6.25 \times (-19.374 + (12.52 \times NFNE_1)).$$

Only 80 percent of MCP is estimated to be true amino acid protein, so microbial amino acids (MAA) production would be:

$$MAA\ (g) = 0.8 \times MCP.$$

To estimate the flow of individual amino acids of microbial origin, the amino acid composition of microbial protein is applied to the estimate of total MAA. Microbial protein is approximately 9.30 grams/100 g lysine, approximately 2.60 grams/100 g methionine, approximately 2.30 grams/100 g histidine and approximately 5.0 grams/100 g phenylalanine. The quantity of essential amino acids that pass into the duadenum rumen from undegraded intake protein can be estimated using techniques described by Craig and Broderick, "Amino Acids Released During Protein Degradation By Rumen Microbes," *Journal of Animal Science* 58:436–443 (1984). Both of these techniques are used and incorporated herein by reference.

The composition in the complete feed form contains about 0.92 to about 5.7 grams/pound (grams/lb. air dried basis) feed of undegraded lysine, preferably about 1.9 to about 2.34 grams/lb. feed of undegraded lysine; about 0.16 to about 2.2 grams/lb. feed of undegraded methionine, preferably about 0.84 to about 0.92 grams/lb. feed of undegraded methionine; about 0.42 to about 3.0 grams/lb. feed of undegraded histidine, preferably about 0.66 to about 1.12 grams/lb. feed of undegraded histidine; about 0.70 to about 5.5 grams/lb. feed of undegraded phenylalanine, preferably about 1.27 to about 2.02 grams/lb. feed of undegraded phenylalanine.

The composition in concentrate form contains about 3.2 to about 8.2 grams/lb. (air dried basis) feed of undegraded lysine, preferably about 4.13 to about 6.97 grams/lb. feed of undegraded lysine; about 0.9 to about 2.8 grams/lb. feed of undegraded methionine, preferably about 1.30 to about 1.97 grams/lb. feed of undegraded methionine; about 1.3 to about 5.9 grams/lb. feed of undegraded histidine, preferably about 1.94 to about 3.09 grams/lb. feed of undegraded histidine; about 2.5 to about 9.0 grams/lb. feed of undegraded phenylalanine, preferably about 3.54 to about 5.69 grams/lb. feed of undegraded phenylalanine.

The composition in blender form contains about 3.3 to about 4.0 grams/lb. (air dried basis) feed of undegraded lysine, preferably about 3.4 to about 3.8 grams/lb. feed of undegraded lysine; about 0.9 to about 1.5 grams/lb. feed of undegraded methionine, preferably about 1.0 to about 1.28 grams/lb. feed of undegraded methionine; about 1.4 to about 2.9 grams/lb. feed of undegraded histidine, preferably about 1.5 to about 1.9 grams/lb. feed of undegraded histidine; about 2.5 to about 4.2 grams/lb. feed of undegraded phenylalanine, preferably about 2.7 to about 3.5 grams/lb. feed of undegraded phenylalanine.

The composition in base mix form contains about 6.7 to about 17.0 grams/lb. (air dried basis) feed of undegraded lysine, preferably about 11 0 to about 15.5 grams/lb. feed of undegraded lysine; about 1.6 to about 5.1 grams/lb. feed of undegraded methionine, preferably about 2.8 to about 4.3 grams/lb. feed of undegraded methionine; about 2.6 to about 9.5 grams/lb. feed of undegraded histidine, preferably about 5.2 to about 9.0 grams/lb. of undegraded histidine; about 4.7 to about 14.8 grams/lb. feed of undegraded phenylalanine, preferably about 9.8 to about 12.9 grams/lb. feed of undegraded phenylalanine.

The complete feed form composition typically contains the following ingredients: wheat middlings; soybean meal; corn gluten meal; distillers grains or distillers grains with solubles; blood meal; macro-minerals, which include calcium, phosphorus, magnesium, potassium, sodium, chlorine and sulfur; trace minerals, which include cobalt, copper, iodine, iron, manganese, selenium and zinc; and vitamins, which include vitamin A, vitamin D and vitamin E. Optional ingredients in the complete feed form composition would commonly include, but not be restricted to fat, corn, meat and bone meal, brewers grains, sunflower meal, malt sprouts, soybean hulls or mixtures thereof.

The concentrate form of the composition typically contains the following ingredients: wheat middlings, soybean meal, corn gluten meal, distillers grains or distillers grains with solubles, blood meal, macro-minerals, trace minerals, and vitamins. Optional ingredients in the concentrate form of the composition would commonly include, but not be restricted to fat, corn, meat and bone meal, sunflower meal, malt sprouts, brewers grains or mixtures thereof.

The blender form of the composition typically contains the following ingredients: wheat middlings, corn gluten meal, distillers grains or distillers grains with solubles, blood meal, macro-minerals, trace minerals, and vitamins. Optional ingredients in the concentrate form of the composition would commonly include, but not be restricted to, meat and bone meal, sunflower meal, corn, soybean meal, fat, malt sprouts, brewers grains or mixtures thereof.

The base mix form of the composition typically contains, but is not restricted to, the following ingredients: wheat middlings, corn gluten meal, distillers grains or distillers grains with solubles, blood meal. Optional ingredients in the base mix form of the composition would commonly include, but not be restricted to, soybean meal, fat macro-minerals, trace minerals, vitamins meat and bone meal, sunflower meal, malt sprouts, brewers grains or mixtures thereof.

The complete feed form of the composition contains about 7 to about 56 weight percent corn, about 20 to about 50 weight percent wheat middlings, about 0.25 to about 2.5 weight percent soybean meal, about 5 to about 19 weight percent distillers grains or distillers grains with solubles, about 5.0 to about 8.0 weight percent blood meal, about 0.5 to about 0.10 weight percent trace minerals, about 2.0 to about 5.1 weight percent macro-minerals and about 2.0 to about 7.0 weight percent corn gluten meal. The complete feed form composition may contain other ingredients including, but not limited to, fat, soybean hulls and malt sprouts. If fat is used, it is employed in an amount of greater than zero to about 3.5 weight percent. Malt sprouts are used in the amount of about greater than zero to about 30 weight percent. The soybean hulls are used in an amount of about greater than zero to about 10 weight percent.

The concentrate form of the composition contains about 18 to about 50 weight percent wheat middlings, about 3.0 to about 16.0 weight percent soybean meal, about 2.5 to about 6.0 weight percent macro-minerals, about 10 to about 20 weight percent distillers grains or distillers grains with solubles, about 0.3 to about 0.5 weight percent trace minerals, about 10.0 to about 28.0 weight percent blood meal and about 5.0 to about 18.0 weight percent corn gluten meal. The concentrate form composition may contain other ingredients including, but not limited to, malt sprouts, corn, meat and bone meal and fat. If desired, malt sprouts are used in the amount of about greater than zero to about 10 weight percent; corn is used in an amount greater than zero to about 5.0 weight percent; and meat and bone meal, if employed, in an amount of greater than zero to about 3.5 weight percent. Fat can be used in am amount of greater than zero to about 5.7 weight percent.

The blender form of the composition contains about 20 to about 50 weight percent wheat middlings, about 4.4 to about 6.9 weight percent macro-minerals, about 10 to about 20 weight percent distillers grains or distillers grains with solubles, about 9.0 to about 15.0 weight percent blood meal, about 0.05 to about 0.2 weight percent trace minerals, and about 4.0 to about 8.0 weight percent corn gluten meal. The blender feed form composition may contain other ingredients including, but not limited to, malt sprouts, corn, soybean meal, meat and bone meal and fat. Malt sprouts are used in the amount of about greater than zero to about 10 weight percent. Corn can be used in an amount greater than zero to about 30 weight percent; soybean meal can be used in an amount greater than zero to about 10 weight percent; meat and bone meal can be used in an amount greater than zero to about 3.5 weight percent; and fat can be used in an amount greater than zero to about 3.5 weight percent.

The base mix form of the composition contains about 5.0 to about 10 weight percent distillers grains or distillers grains with solubles, about 40.0 to about 54.0 weight percent blood meal, and about 15.0 to about 22.0 weight percent corn gluten meal. The base mix form composition may contain other ingredients including, but not limited to, malt sprouts, wheat middlings, meat and bone meal, fat, macro-minerals, and trace minerals. The optional ingredients are used in the following amounts: malt sprouts are used in the amount of greater than zero to about 10 weight percent, greater than zero to about 35 weight percent wheat middlings, greater than zero to about 7.5 weight percent meat and bone meal, greater than zero to about 4.0 weight percent fat, greater than zero to about 4.0 weight percent macro-minerals, and greater than zero to about 0.6 weight percent trace minerals.

It should be noted that there are four primary methods to produce blood meal, which are the following: ring drying, flash drying, cook or vat drying and spray drying. Ring and flash dried blood meal are the most consistent in quality of those types suitable to deliver key essential amino acids pot-ruminally and are preferably used.

When the composition is fed in conjunction with a roughage base of corn silage versus legume or grass, the composition can be adjusted to best compliment the small differences in essential amino acid flow that result from the digestion of these roughage sources. With a predominantly legume or grass roughage base, the post-rumenal methionine supply is less than if corn silage is used. This can be corrected if the proper level of corn gluten meal is used in the composition's formulation, whether it be in the complete feed form, the concentrate form, the blender form or base mix form.

Furthermore, to ensure the increase in milk production, all rations should be properly balanced according to recognized standards put forth in Nutrient Requirements of Dairy Cattle, Sixth Revised Edition (1988), National Research Council, National Academy Press, Washington, D.C. and by Sniffen, et al. (1988) "Balancing for Carbohydrates in Dairy Rations," Proc. 49th Minnesota Nutrition Conference. In addition, sufficient quantities of the composition, whether complete feed form, concentrate form, blender form or base mix form, must be fed to the dairy cattle to achieve a flow of essential amino acids that will meet the requirement previously described.

The composition in the complete feed form generally has a protein amount of about 14 to about 24 weight percent, a fat amount of about 2.0 to about 6.0 weight percent, a fiber maximum of about 12 weight percent, a phosphorus amount of about 0.6 to about 0.9 weight percent, a calcium amount of about 0.9 to about 1.8 weight percent, and total digestible nutrients (TDN) of at least about 71 weight percent.

The composition in the concentrate form generally has a protein amount of about 32 to about 48 weight percent, a fat amount of about 2.0 to about 9.0 weight percent, a fiber maximum of about 8 weight percent, a phosphorus amount of about 0.9 to about 1.2 weight percent, a calcium amount of about 1.3 to about 2.0 weight percent, and total digestible nutrients (TDN) of at least about 71 weight percent.

The composition in the blender form generally has a protein amount of about 24 to about 26 weight percent, a fat amount of about 2.0 to about 7.0 weight percent, a fiber maximum of about 8 weight percent, a phosphorus amount of about 1.0 to about 1.5 weight percent, a calcium amount of about 2.0 to about 3.0 weight percent, and total digestible nutrients (TDN) of at least about 71 weight percent.

The composition in the base mix form generally has a protein amount of about 57 to about 65 weight percent, a fat amount of about 2.0 to about 6.0 weight percent, a fiber maximum of about 8 weight percent, a phosphorus amount of about 0.4 to about 0.9 weight percent, a calcium amount of about 0.6 to about 1.4 weight percent, and total digestible nutrients (TDN) of at least about 69 weight percent.

The complete feed form, concentrate form, blender form and base mix form of the composition are all made in the following manner: by dry mixing ingredients at standard environmental temperatures.

The following Examples are not meant to limit the scope of the invention herein, but are for illustrative purposes only.

EXAMPLES

EXAMPLE 1

A comparative concentrate composition C1, was made by dry mixing and pelleting the following ingredients:

| Ingredient | % |
|---|---|
| Wheat middlings | 24.68 |
| Soybean meal (48% protein) | 70.59 |
| Salt | 0.89 |
| Calcium carbonate | 2.04 |
| Dicalcium phosphate | 1.45 |
| Vitamins/trace minerals | 0.35 |

The invention herein, concentrate composition A, was made by dry mixing and pelleting the following ingredients:

| Ingredient | % |
|---|---|
| Corn | 4.45 |
| Wheat middlings | 35.0 |
| Blood meal | 12.6 |
| Meat and bone meal | 0.24 |
| Malt sprouts | 7.22 |
| Soybean meal (48% protein) | 14.96 |
| Distillers grains w/solubles | 10.0 |
| Corn gluten meal | 5.37 |
| Animal fat | 5.7 |
| Salt | 0.9 |
| Calcium carbonate | 2.08 |
| Cicalcium phosphate | 0.94 |
| Vitamins/trace minerals | 0.54 |

The two compositions were fed to dairy cattle in rations based on corn, corn silage, alfalfa hay, alfalfa haylage and supplemental minerals that were properly balanced according to accepted standards. Performance of these cattle was monitored from the time they were approximately 17 days in milk to approximately 143 days in milk with the results reported in Table 2.

TABLE 2

| | Milk Production of Cows (lb. day) | | | | |
|---|---|---|---|---|---|
| | Days in Milk | | | | |
| Treatment | 17–30 | 31–58 | 58–86 | 87–114 | 115–143 |
| C1 | 69.5 | 77.8 | 76.4 | 72.2 | 68.1 |
| A | 77.1 | 81.8 | 82.9 | 80.0 | 78.1 |
| Advantage | 7.6 | 4.0 | 6.5 | 7.8 | 10.0 |

A comparative concentrate composition C2, was made by dry mixing and pelleting the following ingredients:

| Ingredient | % |
| --- | --- |
| Wheat middlings | 6.60 |
| Soybean meal (48% protein) | 67.06 |
| Distillers grains w/solubles | 19.0 |
| Dried molasses | 0.025 |
| Salt | 1.86 |
| Calcium carbonate | 3.27 |
| Dicalcium phosphate | 1.57 |
| Vitamins/trace minerals | 0.615 |

The invention herein, concentrate composition B, was made by dry mixing and pelleting the following ingredients:

| Ingredient | % |
| --- | --- |
| Wheat middlings | 35.0 |
| Blood meal | 12.6 |
| Meat and bone meal | 0.24 |
| Malt sprouts | 11.67 |
| Soybean meal (48% protein) | 14.29 |
| Distillers grains 2/solubles | 10.0 |
| Corn gluten meal | 5.37 |
| Animal fat | 5.82 |
| Salt | 0.64 |
| Calcium carbonate | 2.08 |
| Magnesium oxide | 0.43 |
| Dicalcium phosphate | 1.24 |
| Vitamins/trace minerals | 0.62 |

The two compositions were fed to dairy cattle in rations based on corn, corn silage, alfalfa hay, alfalfa haylage and appropriate minerals that were properly balanced according to accepted standards. Performance of these cattle was monitored from the time they were approximately 17 days in milk to approximately 149 days in milk. As can be seen in Table 3, the composition increases milk production over other feeds.

TABLE 3

| | Milk production of cows (lb./day) | | | | | |
| --- | --- | --- | --- | --- | --- | --- |
| | Approximate Days in Milk | | | | | |
| Treatment | 17–37 | 38–65 | 66–93 | 94–121 | 122–149 | O.A |
| C2 | 77.2 | 81.4 | 77.4 | 73.8 | 69.3 | 75.5 |
| B | 85.0 | 89.3 | 84.8 | 77.0 | 74.9 | 81.5 |
| Advantage | 7.8 | 7.9 | 7.4 | 3.2 | 5.6 | 6.0 |

The following, Examples 3-18, are examples of feed formulations that, when properly applied, meet the essential amino acid requirements of high producing dairy cows from the combination of microbial essential amino acids, as determined by application of the method of Tilley and Terry, and undegraded essential amino acids as estimated by the techniques of Craig and Broderick.

EXAMPLE 3

A complete feed form composition was prepared by admixing the following ingredients in the following amounts: 55.39 weight percent corn, 20 weight percent wheat middlings, 3.67 weight percent soybean hulls, 0.25 weight percent soybean meal (48% protein), 0.88 weight percent salt, 1.82 weight percent fat, 1.88 weight percent calcium carbonate, 5.0 weight percent distillers grains with solubles, 7.28 weight percent blood meal, 0.99 weight percent dicalcium phosphate, 2.49 weight percent corn gluten meal, 0.23 weight percent magnesium oxide, 0.12 weight percent vitamins and trace minerals.

EXAMPLE 4

A complete feed form composition was prepared by admixing the following ingredients in the following amounts: 43.38 weight percent corn, 25.4 weight percent wheat middlings, 10.0 weight percent soybean hulls, 0.25 weight percent soybean meal (48% protein), 0.88 weight percent salt, 1.91 weight percent fat, 1.80 weight percent calcium carbonate, 5.0 weight percent distillers grains with solubles, 7.43 weight percent blood meal, 0.79 weight percent dicalcium phosphate, 2.81 weight percent corn gluten meal, 0.22 weight percent magnesium oxide, 0.13 weight percent vitamins and trace minerals.

EXAMPLE 5

A complete feed form composition was prepared by admixing the following ingredients in the following amounts: 26.14 weight percent corn, 42.64 weight percent wheat middlings, 10.00 weight percent soybean hulls, 0.25 weight percent soybean meal (48% protein), 0.87 weight percent salt, 1.86 weight percent fat, 2.0 weight percent calcium carbonate, 5.0 weight percent distillers grains with solubles, 7.67 weight percent blood meal, 0.28 weight percent dicalcium phosphate, 3.01 weight percent corn gluten meal, 0.15 weight percent magnesium oxide, 0.13 weight percent vitamins and trace minerals.

EXAMPLE 6

A complete feed form composition was prepared by admixing the following ingredients in the following amounts: 11.0 weight percent corn, 50.0 weight percent wheat middlings, 10.0 weight percent soybean hulls, 7.72 weight percent malt sprouts, 0.25 weight percent soybean meal (48% protein), 0.58 weight percent salt, 2.66 weight percent fat, 2.13 weight percent calcium carbonate, 5.0 weight percent distillers grains with solubles, 7.45 blood meal, 2.95 weight percent corn gluten meal, 0.14 weight percent magnesium oxide, 0.12 vitamins and trace minerals.

EXAMPLE 7

A complete feed form composition was prepared by admixing the following ingredients in the following amounts: 4.96 weight percent corn, 50.0 weight percent wheat middlings, 10.0 weight percent soybean hulls, 1.77 weight percent soybean meal (48% protein), 0.59 weight percent salt, 2.0 weight percent fat, 2.41 weight percent calcium carbonate, 19.0 weight percent distillers grains with solubles, 7.48 blood meal, 1.53 weight percent corn gluten meal, 0.11 weight percent magnesium oxide, 0.15 weight percent vitamins and trace minerals.

EXAMPLE 8

A complete feed form composition was prepared by admixing the following ingredients in the following amounts: 7.22 weight percent corn, 39.50 weight percent wheat middlings, 10.0 weight percent soybean hulls, 22.47 weight percent malt sprouts, 0.25 weight percent soybean meal (48% protein), 0.51 weight percent salt, 3.47 weight percent fat, 2.01 weight percent calcium carbonate, 5.09 weight percent distillers grains with solubles, 6.67 weight percent blood meal, 2.51 weight percent corn gluten meal, 0.21 weight percent magnesium oxide, 0.09 weight percent vitamins and trace minerals.

EXAMPLE 9

A concentrate form composition was prepared by admixing the following ingredients in the following amounts: 22.86 weight percent wheat middlings, 2.5 weight percent meat and bone meal, 10.0 weight percent malt sprouts, 3.39 weight percent soybean meal (48% protein), 0.72 weight percent salt, 5.51 weight percent fat, 1.62 weight percent calcium carbonate, 15.0 weight percent distillers grains with solubles, 21.5 weight percent blood meal, 1.22 weight percent dicalcium phosphate, 14.63 weight percent corn gluten meal, 0.43 weight percent magnesium oxide, and 0.62 weight percent vitamins and trace minerals.

EXAMPLE 10

A concentrate form composition was prepared by admixing the following ingredients in the following amounts: 18.0 weight percent wheat middlings, 3.5 weight percent meat and bone meal, 6.56 weight percent malt sprouts, 7.03 weight percent soybean meal (48% protein), 0.71 weight percent salt, 5.60 weight percent fat, 1.32 weight percent calcium carbonate, 10.0 weight percent distillers grains with solubles, 26.94 weight percent blood meal, 1.30 weight percent dicalcium phosphate, 18.00 weight percent corn gluten meal, 0.42 weight percent magnesium oxide, and 0.62 weight percent vitamins and trace minerals.

EXAMPLE 11

A concentrate form composition was prepared by admixing the following ingredients in the following amounts: 40.56 weight percent wheat middlings, 2.5 weight percent meat and bone meal, 11.67 weight percent soybean meal (48% protein), 0.81 weight percent salt, 5.32 weight percent fat, 1.91 weight percent calcium carbonate, 15.0 weight percent distillers grains with solubles, 10.5 weight percent blood meal, 0.78 weight percent dicalcium phosphate, 10.00 weight percent corn gluten meal, 0.33 weight percent magnesium oxide, and 0.62 weight percent vitamins and trace minerals.

EXAMPLE 12

A concentrate form composition was prepared by admixing the following ingredients in the following amounts: 20.0 weight percent wheat middlings, 3.0 weight percent meat and bone meal, 11.31 weight percent corn gluten meal, 15.81 weight percent soybean meal (48% protein), 0.88 weight percent salt, 5.47 weight percent fat, 1.62 weight percent calcium carbonate, 15.0 weight percent distillers grains with solubles, 13.0 weight percent blood meal, 0.95 weight percent dicalcium phosphate, 12.00 weight percent corn gluten meal, 0.35 weight percent magnesium oxide, and 0.61 weight percent vitamins and trace minerals.

EXAMPLE 13

A concentrate form composition was prepared by admixing the following ingredients in the following amounts: 48.72 weight percent wheat middlings, 2.5 weight percent meat and bone meal, 10.0 weight percent malt sprouts, 4.34 weight percent soybean meal (48% protein), 0.76 weight percent salt, 2.22 weight percent calcium carbonate, 12.55 weight percent distillers grains with solubles, 11.34 weight percent blood meal, 0.80 weight percent dicalcium phosphate, 6.0 weight percent corn gluten meal, 0.32 weight percent magnesium oxide, and 0.45 weight percent vitamins and trace minerals.

EXAMPLE 14

A blender form composition was prepared by admixing the following ingredients in the following amounts: 29.85 weight percent corn, 32.23 weight percent wheat middlings, 1.04 weight percent salt, 3.01 weight percent fat, 2.36 weight percent calcium carbonate, 10.00 weight percent distillers grains with solubles, 13.5 weight percent blood meal, 2.34 weight percent dicalcium phosphate, 5.0 weight percent corn gluten meal, 0.43 weight percent magnesium oxide, and 0.24 weight percent vitamins and trace minerals.

EXAMPLE 15

A base mix form composition was prepared by admixing the following ingredients in the following amounts: 16.87 weight percent Wheat middlings, 3.78 weight percent fat, 1.34 weight percent calcium carbonate, 10.0 weight percent distillers grains with solubles, 43.0 weight percent blood meal, 2.27 weight percent dicalcium phosphate, 21.5 weight percent corn gluten meal, and 1.24 weight percent vitamins and trace materials.

EXAMPLE 16

A base mix form composition was prepared by admixing the following ingredients in the following amounts: 20.35 weight percent wheat middlings, 0.63 weight percent fat, 10.0 weight percent distillers grains with solubles, 53.53 weight percent blood meal, and 15.49 weight percent corn gluten meal.

EXAMPLE 17

Synthetic amino acids that are protected against degradation in the rumen, yet are available for absorption in the lower gut may also be used in the current invention. For example, such a product may contain 70% lysine in a carrier that protects 80% of that lysine from degradation in the rumen yielding a content of 254 grams/lb. of undegraded lysine. A concentrate form composition could be prepared using this ingredient by admixing the following ingredients in the following amounts: 33.88 weight percent wheat middlings, 2.5 weight percent meat and bone meal, 10.0 weight percent malt sprouts, 7.52 weight percent soybean meal (48% protein), 0.75 weight percent salt, 5.83 weight percent fat, 2.08 weight percent calcium carbonate, 19.0 weight percent distillers grains with solubles, 11.71 weight percent blood meal, 1.22 weight percent dicalcium phosphate, 4.46 weight percent corn gluten meal, 0.38 weight percent magnesium oxide, 0.22 weight percent protected lysine and 0.45 weight percent vitamins and trace minerals.

EXAMPLE 18

Methods exist to treat proteinaceous ingredients to reduce their degradability in the rumen. Soybean meal is the most common ingredient treated in this manner.

If 60% protection of soybean meal could be achieved, a concentrate form composition could be prepared using this ingredient by admixing the following ingredients in the following amounts 34.64 weight percent wheat middlings, 2.5 weight percent meat and bone meal, 10.0 weight percent malt sprouts, 7.27 weight percent treated soybean meal (48% protein), 0.75 weight percent salt, 5.82 weight percent fat, 2.08 weight percent calcium carbonate, 19.0 weight percent distillers grains with solubles, 12.26 weight percent blood meal, 1.21 weight percent dicalcium phosphate, 3.64 weight percent corn gluten meal, 0.38 weight percent magnesium oxide, and 0.45 weight percent vitamins and trace minerals.

What is claimed is:

1. A complete dairy cattle feed composition comprising: about 7 to about 56 weight percent corn; about 20 to about 50 weight percent wheat middlings; about 0.25 to about 2.5 weight percent soybean meal; about 2.0 to about 5.1 weight percent macro-minerals; about 5 to about 19 weight percent distillers grains or distillers grains with solubles; about 5.0 to about 8.0 weight percent blood meal; about 0.5 to about 0.10 weight percent trace minerals; and about 2.0 to about 7.0 weight percent corn gluten meal, which composition provides rumen bypass protein and microbial protein balanced in essential amino acids post-ruminally.

2. The complete dairy cattle feed composition as in claim 1 which further contains ingredients selected from the group consisting of greater than zero to about 30 weight percent malt sprouts, greater than zero to about 10 weight percent soybean hulls, greater than zero to about 3.5 weight percent fat, and mixtures thereof.

3. The complete dairy cattle feed composition as in claim 1 wherein the composition on an (air dried basis) contains about 0.92 to about 5.7 grams/lb. feed of undegraded lysine; about 0.16 to about 2.2 grams/lb. feed of undegraded methionine; about 0.42 to about 3.0 grams/lb. feed of undegraded histidine; and about 0.70 to about 5.5 grams/lb. feed of undegraded phenylalanine.

4. The complete dairy cattle feed composition as in claim 3 wherein the composition on an (air dried basis) contains about 2.34 grams/lb. feed of undegraded lysine; about 0.84 to about 0.92 grams/lb. feed of undegraded methionine; about 0.66 to about 1.12 grams/lb. feed of undegraded histidine; and about 1.27 to about 2.02 grams/lb. feed of undegraded phenylalanine.

5. The complete dairy cattle feed composition of claim 1 wherein the trace minerals are selected from the group consisting of cobalt, copper, iodine, iron, manganese, selenium, zinc and mixtures thereof.

6. The complete dairy cattle feed composition of claim 5 wherein the macro-minerals are selected from the group consisting of calcium, phosphorus, magnesium, potassium, sodium, chlorine, sulfur and mixtures thereof.

7. The complete dairy cattle feed composition of claim 1 wherein the percent protein level in the composition is about 14 to 24 percent.

8. A complete dairy cattle feed composition as in claim 1 which has a protein amount of about 14 to about 24 weight percent; a fat amount of about 2 to about 6 weight percent; maximum fiber of about 12 weight percent; phosphorus of about 0.6 to about 0.9 weight percent; calcium of about 0.9 to about 1.8 weight percent; and total digestible nutrients of at least about 71 weight percent.

9. A concentrate dairy cattle feed composition comprising: about 18 to about 50 weight percent wheat middlings, about 3.0 to about 16.0 weight percent soybean meal; about 2.5 to about 6.0 weight percent macro-minerals; about 10 to about 20 weight percent distillers grains or distillers grains with solubles; about 10.0 to about 28.0 eight percent blood meal; about 0.3 to about 0.5 weight percent trace minerals; about 5 to about 18 weight percent corn gluten meal, which composition provides rumen bypass protein and microbial protein balanced in essential amino acids post-ruminally.

10. The concentrate dairy cattle feed composition of claim 9 wherein the composition further contains ingredients selected from the group consisting of greater than zero to about 10 weight percent malt sprouts, greater than zero to about 5 weight percent corn, greater than zero to about 3.5 weight percent meant and bone meal, greater than zero to about 5.7 weight percent fat, and mixtures thereof.

11. The concentrate feed composition of claim 9 wherein the composition contains about 3.2 to about 8.2 grams/lb. feed of undegraded lysine; about 0.9 to about 2.8 grams/lb. feed of undegraded methionine; about 1.3 to about 5.9 grams/lb. feed of undegraded histidine; and about 2.5 to about 9.0 grams/lb. feed of undegraded phenylalanine.

12. The concentrate dairy cattle feed composition of claim 11 wherein the trace minerals are selected from the group consisting of cobalt, copper, iodine, iron, manganese, selenium, zinc and mixtures thereof.

13. The concentrate feed composition of claim 12 wherein the macro-minerals are selected from the group consisting of calcium, phosphorus, magnesium, potassium, sodium, chlorine, sulfur and mixtures thereof.

14. The concentrate dairy cattle feed composition of claim 9 wherein the composition on an (air dried basis) contains about 4.13 to about 6.97 grams/lb. feed of undegraded lysine; about 1.30 to about 1.97 grams/lb. feed of undegraded methionine; about 1.94 to about 3.09 grams/lb. feed of undegraded histidine; and about 3.54 to about 5.69 grams/lb. feed of undegraded phenylalanine.

15. The concentrate dairy cattle feed composition of claim 9 wherein the percent protein level of the composition is about 32 to 48 percent.

16. The concentrate dairy cattle feed composition of claim 9 which has a protein amount of about 32 to about 48 weight percent; a fat amount of about 2.0 to about 9 weight percent; maximum fiber of about 8 weight percent; phosphorus of about 0.9 to about 1.2 weight percent; calcium of about 1.3 to about 2.0 weight percent; and total digestible nutrients of at least about 71 weight percent.

17. A blender dairy cattle feed composition comprising: about 20 to about 50 weight percent wheat middlings, about 4.4 to about 6.9 weight percent macrominerals; about 10 to about 20 weight percent distillers grains or distillers grains with solubles; about 9 to about 15 weight percent blood meal; about 0.05 to about 0.2 weight percent trace minerals; and about 4.0 to about 8.0 weight percent corn gluten meal, which composition provides rumen bypass protein and microbial protein balanced in essential amino acids post-ruminally.

18. The blender dairy cattle feed composition as in claim 17 which further contains ingredients selected from the group consisting of greater than zero to about 10 weight percent malt sprouts, greater than zero to about 30 weight percent corn, greater than zero to about 10 weight percent soybean meal, greater than zero to about 3.5 weight percent meat and bone meal, greater than zero to about 3.5 weight percent fat, and mixtures thereof.

19. The blender dairy cattle feed composition as in claim 18 wherein the composition on an (air dried basis) contains about 3.3 to about 4.0 grams/lb. feed of undegraded lysine; about 0.9 to about 1.5 grams/lb. feed of undegraded methionine; about 1.4 to about 2.9 grams/lb. feed of undegraded histidine; and about 2.5 to about 4.2 grams/lb. feed of undegraded phenylalanine.

20. The blender dairy cattle feed composition as in claim 19 wherein the composition on an (air dried basis) contains about 3.4 to about 3.8 grams/lb. feed of undegraded lysine; about 1.0 to about 1.28 grams/lb. feed of undegraded methionine; about 1.5 to about 1.9 grams/lb. feed of undegraded histidine; and about 2.7 to about 3.5 grams/lb. feed of undegraded phenylalanine.

21. The blender dairy cattle feed composition of claim 19 wherein the percent protein level of the composition is about 24 to 26 percent.

22. The blender dairy cattle feed composition as in claim 19 which has a protein amount of about 24 to about 26 weight percent; a fat amount of about 2.0 to about 7 weight percent; maximum fiber of about 8 weight percent; phosphorus of about 1.0 to about 1.5 weight percent; calcium of about 2.0 to about 3.0 weight percent; and total digestible nutrients of at least about 71 weight percent.

23. The blender dairy cattle feed composition of claim 17 wherein the trace minerals are selected from the group consisting of cobalt, copper, iodine, iron, manganese, selenium, zinc and mixtures thereof.

24. The blender dairy cattle feed composition of claim 23 wherein the macro-minerals are selected from the group consisting of calcium, phosphorus, magnesium, potassium, sodium, chlorine, sulfur and mixtures thereof.

25. A base mix dairy cattle feed composition comprising about 5.0 to about 10 weight percent distillers grains or distillers grains with solubles, about 40 to about 54.0 weight percent blood meal and about 15.0 to about 22.0 weight percent corn gluten meal, which composition provides rumen bypass protein and microbial protein balanced in essential amino acids post-ruminally.

26. The base dry mix dairy cattle feed composition as in claim 25 which further contains ingredients selected from the group consisting of greater than zero to about 10.0 weight percent malt sprouts, greater than zero to about 35.0 weight percent wheat middlings, greater than zero to about 7.5 weight meat and bone meal, greater than zero to about 4.0 weight percent fat, about greater than zero to about 4.0 weight percent macro-minerals, greater than zero to about 0.6 weight percent trace minerals and mixtures thereof.

27. The base mix dairy cattle feed composition as in claim 25 wherein the composition on an (air dried basis) contains about 6.7 to about 17.0 grams/lb. feed of undegraded lysine; about 1.6 to about 5.1 grams/lb. feed of undegraded methionine; about 2.6 to about 9.5 grams/lb. feed of undegraded histidine; and about 4.7 to about 14.8 grams/lb. feed of undegraded phenylalanine.

28. The base mix dairy cattle feed composition as in claim 27 wherein the composition on an (air dried basis) contains about 11.0 to about 15. 5 grams/lb. feed of undegraded lysine; about 2.8 to about 4.3 grams/lb. feed of undegraded methionine; and about 5.2 to about 9.0 grams/lb. feed of undegraded histidine; about 9.8 to about 12.9 grams/lb. feed of undegraded phenylalanine.

29. The base mix feed composition of claim 27 wherein the macro-minerals are selected from the group consisting of calcium, phosphorus, magnesium, potassium, sodium, chlorine, sulfur and mixtures thereof.

30. The base mix cattle feed composition of claim 29 wherein the trace minerals are selected from the group consisting of cobalt, copper, iodine, iron, manganese, selenium, zinc and mixtures thereof.

31. The base mix dairy cattle feed composition of claim 27 wherein the protein level of the composition is about 55 to 65 percent.

32. The base mix dairy cattle feed composition as in claim 25 which has a protein amount of about 57 to about 65 weight percent; a fat amount of about 2 to about 6.0 weight percent; a fiber maximum of about 8 weight percent, a phosphorus of about 0.4 to about 0.9 weight percent, a calcium amount of about 0.6 to about 1.4 weight percent and total digestible nutrients of at least about 69 weight percent.

33. A method of increasing milk production in dairy cattle wherein the cattle are fed the composition which comprises about 18 to about 50 weight percent wheat middlings, about 3.0 to about 16.0 weight percent soybean meal; about 2.5 to about 6.0 weight percent macro-minerals; about 10 to about 20 weight percent distillers grains or distillers grains with solubles; about 10.0 to about 28.0 weight percent blood meal; about 0.3 to about 0.5 weight percent trace minerals; about 5 to about 18 weight percent corn gluten meal and is further combined with grains selected from the group consisting of corn, barley, oats, millet, rice sorghum, wheat and mixtures thereof in an about from about 6 to about 37 lbs./day to meet a cow's daily amino acid requirement, which composition provides rumen bypass protein and microbial protein balanced in essential amino acids post-ruminally.

34. A method of increasing milk production in dairy cattle wherein the cattle are fed the composition comprising: about 20 to about 50 weight percent wheat middlings, about 4.4 to about 6.9 weight percent macro-minerals; about 10 to about 20 weight percent distillers grains or distillers grains with solubles; about 9 to about 15 weight percent blood meal; about 0.05 to about 0.2 weight percent trace minerals; about 4.0 to about 8.0 weight percent corn gluten meal, wherein the composition is further combined with grains selected from the group consisting of corn, barley, oats, millet, rice sorghum, wheat and mixtures thereof in an about from about 6 to about 37 lbs./day to meet a cow's daily amino acid requirement, which composition provides rumen bypass protein and microbial protein balanced in essential amino acids post-ruminally.

35. A method of increasing milk production in dairy cattle wherein the cattle are fed the composition comprising: about 5.0 to about 10.0 weight percent distillers grains or distillers grains with solubles, about 40.0 to about 54.0 weight percent blood meal and about 15.0 to about 22.0 weight percent corn gluten meal, wherein the composition is further combined with grains selected from the group consisting of corn, barley, oats, millet, rice sorghum, wheat and mixtures thereof in an about from about 6 to about 37 lbs./day to meet a cow's daily amino acid requirement, which composition provides rumen bypass protein and microbial protein balanced in essential amino acids post-ruminally.

36. A method of increasing milk production in dairy cattle wherein the cattle are fed the composition comprising: about 7 to about 56 weight percent corn; about 20 to about 50 weight percent wheat middlings, about 0.25 to about 2.5 weight percent soybean meal; 2 to about 5.1 weight percent macro-minerals; about 5 to about 19 weight percent distillers grains or distillers grains with solubles; about 5.0 to about 8.0 weight percent blood meal; about 0.5 to about 0.10 weight percent trace minerals; about 2.0 to about 7.0 weight percent corn gluten meal, which composition provides rumen bypass protein and microbial protein balanced in essential amino acids post-ruminally.

37. The method of claims 33, 34, 35 or 36 wherein the composition supplies to the duodenum, about 69 to about 332 grams/day lysine, about 20 to about 105 grams/day methionine, about 22 to about 113 grams/day histidine and about 44 to about 225 grams/day phenylalanine from the combination of microbial protein and undegraded essential amino acids to meet a cow's daily protein requirement.

38. The method of claim 37 wherein the composition obtains part of its undegraded essential amino acids from ruminally protected synthetic amino acids or ruminally protected protein.

39. The method of claim 38 wherein the ruminally protected protein is obtained from treated soybean meal.

* * * * *

UNITED STATES PATENT AND TRADEMARK OFFICE
CERTIFICATE OF CORRECTION

PATENT NO. : 5,145,695

DATED : September 8, 1992

INVENTOR(S) : Smith et al.

It is certified that error appears in the above identified patent and that said Letters Patent is hereby corrected as shown below:

TITLE PAGE:

Item [56] References Cited, under Other Publications, line 12, change "Faty" to --Fatty--.

[57] Abstract, line 2, change "diary" to --dairy--;
line 5, after "post-ruminally" insert a comma; and
line 11, after "iodine" change the semi-colon to a comma.

Column 2, line 52, change "grain" to --grains--.
Column 3, line 53, change "Kg." to --kg.--.
Column 3, line 54, change "Kg." to --kg.--.
Column 3, line 58, change "Kg." to --kg.--.
Column 3, line 62, change "Kg." to --kg.-- (both occurrences).
Column 3, line 67, change "Kg." to --kg.--.
Column 4, line 6, change "Kg." to --kg.-- (both occurrences).
Column 4, line 24, change "non-fat" to --nonfat--.
Column 4, line 28, change "non-fat" to --nonfat--.
Column 4, line 50, change "duadenum" to --duodenum--.
Column 4, line 50, delete "rumen".
Column 4, line 54, after "Science" insert a comma.
Column 5, line 27, change "11 0" to --11.0--.

Column 6, line 7, insert commas after "fat" and "vitamins".
Column 6, line 43, change "am" to --an--.

Column 8, line 47, change "Cicalcium" to --Dicalcium--.
Column 8, line 65, insert the heading --EXAMPLE 2--.

UNITED STATES PATENT AND TRADEMARK OFFICE
CERTIFICATE OF CORRECTION

PATENT NO. : 5,145,695

DATED : September 8, 1992

INVENTOR(S) : Smith et al.

It is certified that error appears in the above-identified patent and that said Letters Patent is hereby corrected as shown below:

Column 8, line 66, after "composition" insert a comma.
Column 12, line 19, change "Wheat" to --wheat--.
Column 12, line 59, delete the paragraph indentation.
Column 12, line 62, after "amounts" insert a colon.

IN THE CLAIMS:

Column 13, line 33, change "as in" to --of--.

Column 13, line 35, after "contains" insert --about 1.9 to--.

Column 13, line 52, change "A" to --The--.

Column 13 , line 66, change "eight" to --weight--.

Column 14, line 8, change "meant" to --meat--.

Column 14, line 10, after "fat" delete the comma.

Column 14, line 11, after "concentrate" insert --dairy cattle--.

Column 14, line 12, after "composition" insert --on an (air dried basis)--.

Column 14, line 22, after "concentrate" insert --dairy cattle--.

UNITED STATES PATENT AND TRADEMARK OFFICE
CERTIFICATE OF CORRECTION

PATENT NO.   :   5,145,695
DATED        :   September 8, 1992
INVENTOR(S)  :   Smith et al.

It is certified that error appears in the above-identified patent and that said Letters Patent is hereby corrected as shown below:

Column 14, lines 47-48, change "macrominerals" to --macro-minerals--.

Column 14, line 62, after "fat" delete the comma.

Column 15, line 37, after "base" delete "dry".

Column 15, line 42, after "weight" insert --percent--.

Column 15, line 56, change "15. 5" to --15.5--.

Column 15, line 61, after "mix" insert --dairy cattle--.
Column 15, line 65, after "mix" insert --dairy--.

Column 16, lines 23, 39 and 53, after "rice" insert --,--.

Column 16, lines 24, 40 and line 54, change "about", first occurrence in each line, to --amount--.

Column 16, line 32, after "middlings" change the comma to a semi-colon.

Signed and Sealed this

Seventeenth Day of May, 1994

Attest:

BRUCE LEHMAN

*Attesting Officer*    *Commissioner of Patents and Trademarks*